United States Patent
Gupta et al.

(10) Patent No.: US 9,712,417 B2
(45) Date of Patent: Jul. 18, 2017

(54) COLLISION CONTROL DURING DELAY MEASUREMENT IN OPTICAL TRANSPORT NETWORKS

(71) Applicants: Vijayant Gupta, Plano, TX (US); Suguna Paul, Plano, TX (US)

(72) Inventors: Vijayant Gupta, Plano, TX (US); Suguna Paul, Plano, TX (US)

(73) Assignee: Fujitsu Limited, Kawasaki (JP)

( * ) Notice: Subject to any disclaimer, the term of this patent is extended or adjusted under 35 U.S.C. 154(b) by 193 days.

(21) Appl. No.: 14/618,620

(22) Filed: Feb. 10, 2015

(65) Prior Publication Data
US 2015/0326312 A1 Nov. 12, 2015

Related U.S. Application Data

(60) Provisional application No. 61/989,321, filed on May 6, 2014.

(51) Int. Cl.
*H04L 12/26* (2006.01)
*H04J 3/14* (2006.01)
*H04B 10/079* (2013.01)

(52) U.S. Cl.
CPC ......... *H04L 43/10* (2013.01); *H04B 10/0795* (2013.01); *H04J 3/14* (2013.01); *H04L 43/0864* (2013.01); *H04J 2203/0051* (2013.01); *H04J 2203/0057* (2013.01)

(58) Field of Classification Search
CPC ........ H04L 43/10; H04L 43/0864; H04J 3/14; H04J 2203/0057; H04J 2203/0051; H04B 10/0795
See application file for complete search history.

(56) References Cited

PUBLICATIONS

"Interfaces of the Optical Transport Network," G.709/Y.1331 Standard, International Telecommunication Union (ITU), Feb. 2012, 238 pages.
"Understanding OTN Optical Transport Network (G.709)," Alcatel-Lucent, Apr. 2010, 35 pages.
"An overview of ITU-T G.709," Agilent Technologies, 2001, 12 pages.

*Primary Examiner* — Leslie Pascal
(74) *Attorney, Agent, or Firm* — Baker Botts L.L.P.

(57) ABSTRACT

Methods and systems for collision control during delay measurements in optical transport networks include scheduling delay measurements in time slices of a time window. At most, one delay measurement per time slice is scheduled and performed for each optical data unit (ODU) in an optical transport network (OTN).

20 Claims, 5 Drawing Sheets

COLLISION CONTROL DURING DELAY MEASUREMENT IN OPTICAL TRANSPORT NETWORKS

CROSS-REFERENCE TO RELATED APPLICATIONS

This application claims priority from U.S. Provisional Application No. 61/989,321 filed May 6, 2014, entitled "COLLISION CONTROL DURING DELAY MEASUREMENT IN OPTICAL TRANSPORT NETWORKS".

BACKGROUND

Field of the Disclosure

The present disclosure relates to optical transport networks, and more specifically, to collision control during delay measurement in optical transport networks.

Description of the Related Art

A communication network may include network elements that route packets through the network. Some network elements may include a distributed architecture, wherein packet processing may be distributed among several subsystems of the network element (e.g., line cards). Thus, network elements may be modular and may include various subsystems and/or subelements, which may be represented as logical and/or physical entities. The logical and/or physical entities included in a network element may refer to the network element, a shelf, a slot, a port, a channel and/or various combinations thereof.

When network elements are used in optical transport networks (OTN), delay measurements (DM) may be performed to measure round trip path delay between two network elements.

SUMMARY

In one aspect, a disclosed method for collision control during delay measurement in optical networks is performed at an optical transport network (OTN) node processing optical data units (ODU) respectively corresponding to different OTNs associated with the OTN node. The method may include scheduling a plurality of time slices in a time window. In the method, each of the time slices may correspond to a delay measurement cycle during which delay measurements are performed. The method may include adding a first delay measurement cycle to a first time slice in the time slices. In the method, the first delay measurement cycle may be associated with a first ODU and a first delay measurement layer of the first ODU. In the method, when the first delay measurement cycle is added to the first time slice, the first time slice may not already include a delay measurement associated with the first ODU. The method may further include successively performing the delay measurements in each delay measurement cycle corresponding to each successive time slice in the time window, including setting a delay measurement source to a delay measurement sink during the delay measurement cycle upon completion of each delay measurement.

In any of the disclosed embodiments of the method, an initial time slice to begin the time window may be selected at random. In any of the disclosed embodiments of the method, a time slice may be a one second period and a time window may include 180 time slices. In the method, a delay measurement layer may correspond to a tandem connection monitoring layer in an International Telecommunications Union-Telecommunication Standardization Sector (ITU-T) G.709 ODU frame structure.

In any of the disclosed embodiments, the method may include selecting the first time slice as a next available time slice that does not include a delay measurement associated with the first ODU.

In any of the disclosed embodiments of the method, the method operation of adding the first delay measurement may include adding the first delay measurement in response to a request for a delay measurement. In any of the disclosed embodiments of the method, the method operation of adding the first delay measurement may include adding the first delay measurement in response to activating pro-active delay measurements at the OTN node. In the method, a pro-active delay measurement may be repeated at a given time slice in each time window. In any of the disclosed embodiments of the method, the first time slice may be randomly selected.

Additional disclosed aspects for collision control during delay measurement in optical networks include an article of manufacture comprising a non-transitory, computer-readable medium, and computer executable instructions stored on the computer-readable medium. A further aspect includes a network element comprising a memory, a processor coupled to the memory, and processor-executable instructions stored on the memory.

BRIEF DESCRIPTION OF THE DRAWINGS

For a more complete understanding of the present invention and its features and advantages, reference is now made to the following description, taken in conjunction with the accompanying drawings, in which.

DESCRIPTION OF PARTICULAR EMBODIMENT(S)

Figure 1:
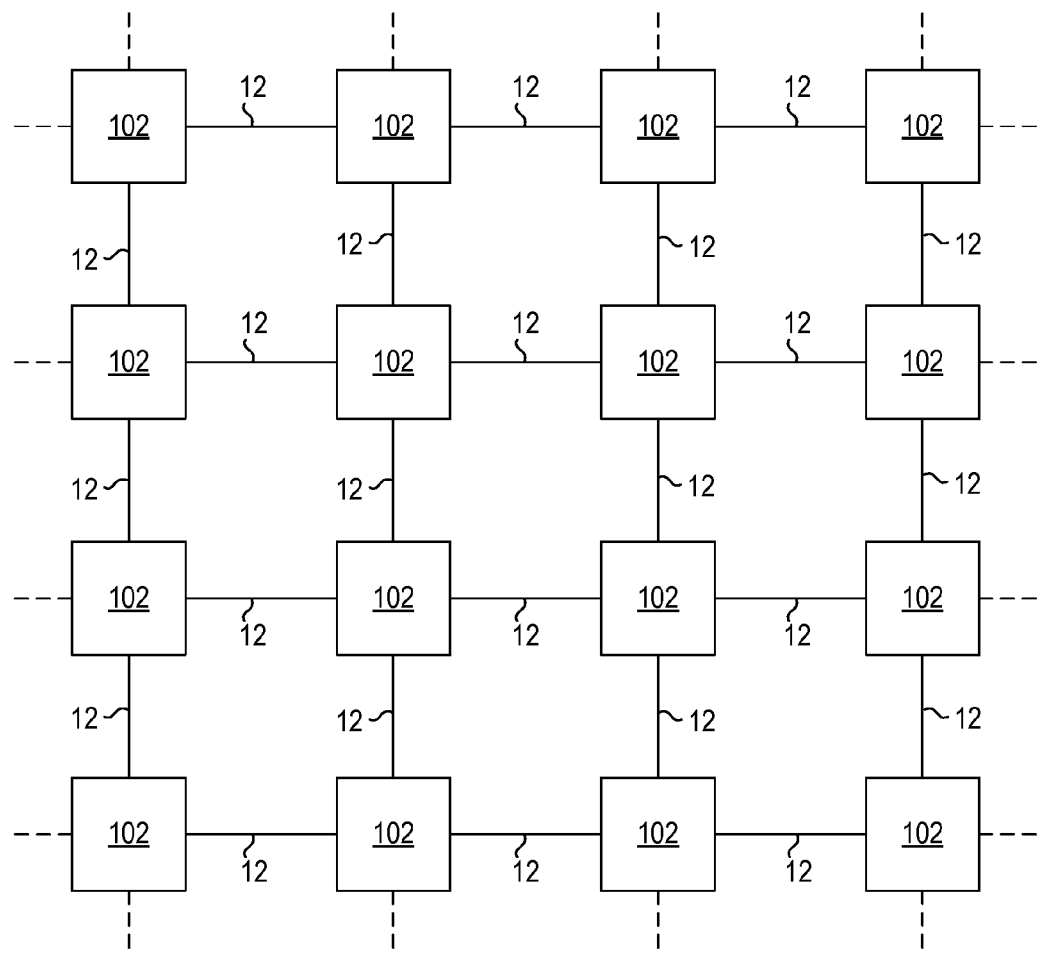
FIG. 1 is a block diagram of selected elements of an embodiment of a network.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, as an example (not shown in the drawings), widget "12-1" refers to an instance of a widget class, which may be referred to collectively as widgets "12" and any one of which may be referred to generically as a widget "12". In the figures and the description, like numerals are intended to represent like elements.

The International Telecommunications Union-Telecommunication Standardization Sector (ITU-T) standard G.709 defines various aspects of an optical transport network (OTN), such as operations, administration, maintenance, and provisioning, among others. The functionality in ITU-T G.709 has been widely adopted by optical networking service providers, including for multi-channel (or multi-wavelength) optical networks, such as optical networks employing dense wavelength division multiplexing (DWDM). In ITU-T G.709 a digital frame wrapper is defined for an OTN that enables original frames of data to be encapsulated into an optical data unit (ODU), irrespective of a network protocol used for the original frames. Thus, the ODU is the transport container defined to carry client signals from ingress nodes to egress nodes within a particular OTN. Accordingly, each particular OTN will have a particular ODU that may be used to identify the OTN.

Furthermore, ITU-T G.709 specifies a frame structure for an ODU that is divided into 4 rows of 4080 bytes, which remains the same for different line rates. Among the defined portions of the ODU frame is a path monitoring (PM) and tandem connection monitoring (TCM) byte at row 2, byte 3 in an ODU overhead portion of the ODU frame. The PM&TCM byte includes 6 delay measurement (DM) signal bits for respective TCM layers 1-6, as well as a PM delay measurement bit to enable various delay measurements in the OTN (see also FIG. 2). Delay measurements in an OTN are used to measure round trip time (or delay) of an ODU between selected ends of an optical path segment in the OTN (see also FIG. 3), for example, optical path segments associated with particular TCM layers.

When a delay measurement is initiated for a given TCM layer (or for PM), the corresponding DM signal bit in an ODU is inverted at an initiating node of the delay measurement, which becomes a DM source node. The ODU with the inverted DM signal bit is sent to a remote node for the delay measurement, which is a DM sink node that immediately returns the ODU to the DM source node without altering the DM signal bit. When the DM source node receives the returned ODU frame, the DM source node recognizes the state of the DM signal bit and can calculate the round trip time for the ODU.

In practice, any node in the OTN may initiate such a delay measurement at any time. When ODUs associated with delay measurements arrive unexpectedly at DM source nodes from different DM sink nodes, so-called collisions in the DM signal bit may occur and may result in incorrect delay measurements, which is undesirable. When single trigger (or on-demand) delay measurements are performed, collisions in the DM signal bit may be relatively seldom and may not be problematic to a significant degree. When multiple trigger delay measurements, involving repeated trigger delay measurements are initiated at both ends of a communication path in the OTN, for example, collisions may adversely affect the results of such delay measurements to a significant degree. Certain network elements may support pro-active delay measurements that automatically initiate delay measurement periodically in a continual manner to enable historical tracking of network performance and quality of service. When both ends of the communication path have pro-active delay measurements enabled, collisions in the DM signal bit may be more likely to occur. One known strategy for addressing such collisions is to filter out results of delay measurements for ostensibly outlier values, which may be an undesirable retroactive approach that does not solve the collision issue and does not meet the standards and expectations of network carriers.

As will be described in further detail, the inventors of the present disclosure have devised an approach to avoid collisions during delay measurements for collision control in optical transport networks. The methods and systems described herein for collision control during delay measurement in optical transport networks enable scheduling of delay measurements to reduce the likelihood of collisions occurring. The methods and systems described herein for collision control during delay measurement in optical transport networks may be used with on-demand or pro-active delay measurements. The methods and systems described herein for collision control during delay measurement may be used in optical transport networks supporting the ITU-T G.709 standard and the ODU frame structure specified therein.

Turning now to the drawings, FIG. 1 is a block diagram showing selected elements of an embodiment of network 100. In certain embodiments, network 100 may be an Ethernet network. Network 100 may include one or more transmission media 12 operable to transport one or more signals communicated by components of network 100. The components of network 100, coupled together by transmission media 12, may include a plurality of network elements 102. In the illustrated network 100, each network element 102 is coupled to four other nodes. However, any suitable configuration of any suitable number of network elements 102 may create network 10. Although network 100 is shown as a mesh network, network 100 may also be configured as a ring network, a point-to-point network, or any other suitable network or combination of networks. Network 10 may be used in a short-haul metropolitan network, a long-haul inter-city network, or any other suitable network or combination of networks.

Each transmission medium 12 may include any system, device, or apparatus configured to communicatively couple network devices 102 to each other and communicate information between corresponding network devices 102. For example, a transmission medium 12 may include an optical fiber, an Ethernet cable, a T1 cable, a WiFi signal, a Bluetooth signal, and/or other suitable medium.

Network 100 may communicate information or "traffic" over transmission media 12. As used herein, "traffic" means information transmitted, stored, or sorted in network 100. Such traffic may comprise optical or electrical signals configured to encode audio, video, textual, and/or any other suitable data. The data may also be transmitted in a synchronous or asynchronous manner, and may transmitted deterministically (also referred to as 'real-time') and/or stochastically. In particular embodiments, traffic may be communicated via a suitable communications protocol, including, without limitation, the Internet Protocol (IP). Additionally, the traffic communicated via network 100 may be structured in any appropriate manner including, but not limited to, being structured in frames, packets, or an unstructured bit stream.

Each network element 102 in network 100 may comprise any suitable system operable to transmit and receive traffic. In the illustrated embodiment, each network element 102 may be operable to transmit traffic directly to one or more other network elements 102 and receive traffic directly from the one or more other network elements 102.

Modifications, additions, or omissions may be made to network 100 without departing from the scope of the disclosure. The components and elements of network 100 described may be integrated or separated according to particular needs. Moreover, the operations of network 100 may be performed by more, fewer, or other components.

In operation, when network 100 represents an optical transport network (OTN), delay measurements may be performed between two network elements 102 to measure round trip delay (or latency) of a communication path between the two network elements 102. To perform a delay measurement (DM) in an OTN, a single DM signal bit may be associated with a PM layer or up to 6 TCM layers, as described previously. To perform the delay measurement, one of the two network elements 102 serves as a DM source while the other network element 102 serves as the DM sink. The DM source triggers the delay measurement by inverting the DM signal bit (i.e., from 0 to 1 or from 1 to 0), while the DM sink operates in loopback mode to return the DM signal bit back to the DM source as received by the DM sink. The DM signal bit is typically left unchanged between delay measurements at network element 102. The DM source may start a timer when the delay measurement is triggered by sending the ODU frame with the newly inverted DM signal bit. The DM source may stop the timer when an ODU frame with the same DM signal bit is received (see also FIG. 3). Other procedures and methods for manipulating the DM signal bit may be practiced in various embodiments. The value of the timer indicates the round trip time of the ODU frame between the DM source and the DM sink thereby generating a result of the delay measurement. It is noted that the delay measurement, as described above, may not produce information indicating a delay time for traversing a unidirectional path between the DM source and the DM sink.

In particular embodiments, certain network elements 102, which are enabled to perform delay measurements in an OTN, may support single trigger as well as repeated trigger delay measurements, which may be automatically triggered in a periodic manner by network element 102. The single trigger delay measurements may be referred to as on-demand delay measurements and may be initiated in response to an external input, such as a request for a delay measurement. The repeated trigger delay measurements may include pro-active delay measurements, as described previously. When pro-active delay measurements are enabled at both network elements 102 at terminal nodes of a communication path, for example, a possibility of DM collisions may be operationally significant, because only a singular DM signal bit in the ODU frame is used. For example, when both network elements 102 at terminal nodes of the communication path trigger a delay measurement simultaneously or substantially simultaneously, an increased probability of DM collisions may exist and may result in a distorted or erroneous value for the result of the delay measurement, which may not provide an accurate value for the round trip delay. As will be described in further detail herein, network elements 102 may support on-demand and pro-active delay measurements with a collision control algorithm for reducing the probability of DM collisions.

Figure 2:
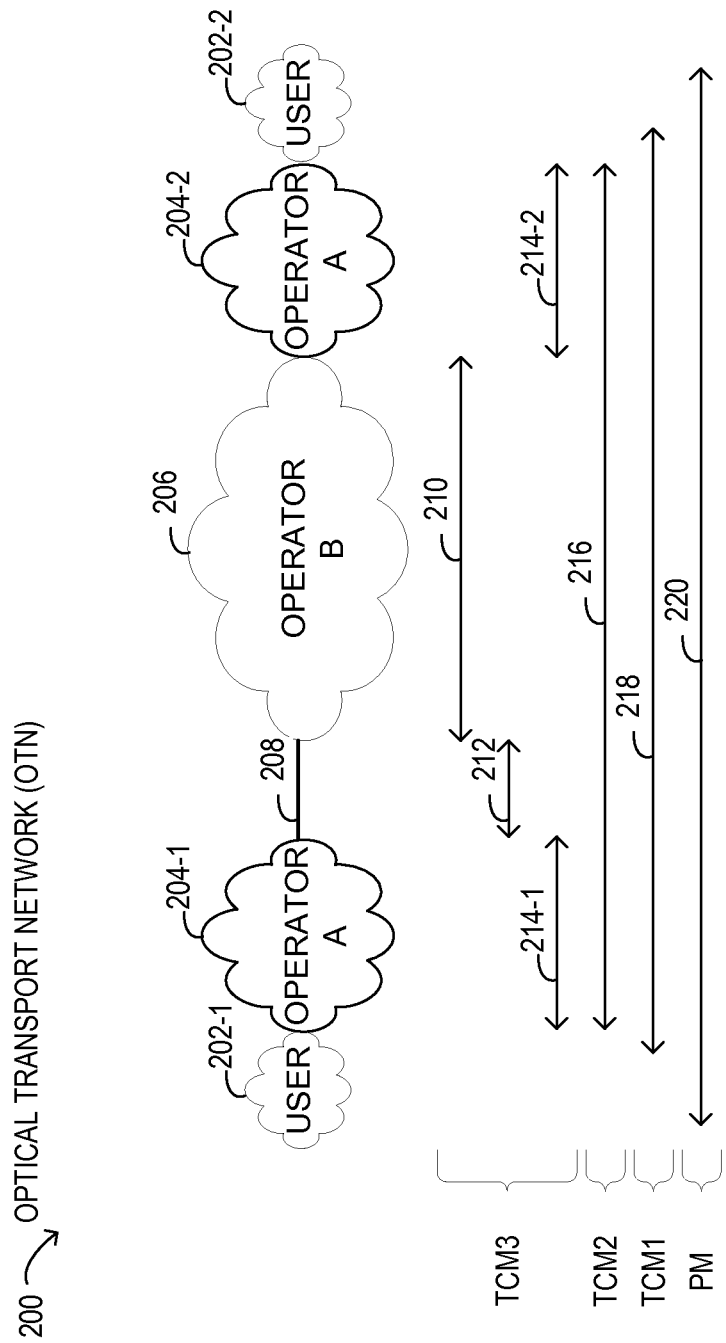
FIG. 2 is a block diagram of selected elements of an embodiment of an optical transport network illustrating path management (PM) and tandem connection monitoring (TCM) layers.

Referring now to FIG. 2, a block diagram of selected elements of an embodiment of an optical transport network (OTN) 200 illustrating path management (PM) and tandem connection monitoring (TCM) layers is presented. In FIG. 2, OTN 200 is shown including network connections between user domain 202-1 and user domain 202-2, which may represent terminal portions of OTN 200. User domain 202-1 may directly connect to domain 204-1 provided by Operator A representing a first arbitrary network carrier providing network services to a client associated with user domains 202. Domain 204-1 may further connect to domain 206 via inter-connection 208. Domain 206 may be provided by Operator B representing a second arbitrary network carrier providing network services to the client associated with user domains 202. Domain 206 may directly connect to domain 204-2 provided by Operator A. Domain 204-2 may directly connect to user domain 202-2. As shown, OTN 200 may transport an ODU within OTN 200. The ODU may include an identifier that is uniquely associated with OTN 200, for example.

As shown in OTN 200, a PM layer may be associated with path 220, which is an end-to-end path in OTN 200 from an ingress (or terminal) node at user domain 202-1 to an egress (or terminal) node at user domain 202-2. In OTN 200, a TCM1 layer may be associated with path 218, which is a path from any node in user domain 202-1 to any node in user domain 202-2. The TCM1 layer may accordingly correspond to user quality-of-service supervision in OTN 200. In OTN 200, a TCM2 layer may be associated with path 216 from an ingress (or terminal) node at domain 204-1 to an egress (or terminal) node at domain 204-2. The TCM2 layer may accordingly correspond to supervision of Operator A in OTN 200. In OTN 200, a TCM3 layer be associated with paths 214-1 and 214-2, which are paths within domains 204-1 and 204-2, with path 212, which is a path along inter-connection 208, and with path 210, which is a path within domain 206. The TCM3 layer may accordingly correspond to domain and domain interconnect supervision in OTN 200. OTN 200 is shown with 1 PM and 3 TCM layers for descriptive clarity. It is noted that, in various embodiments, fewer or more TCM layers may be used.

Figure 3:
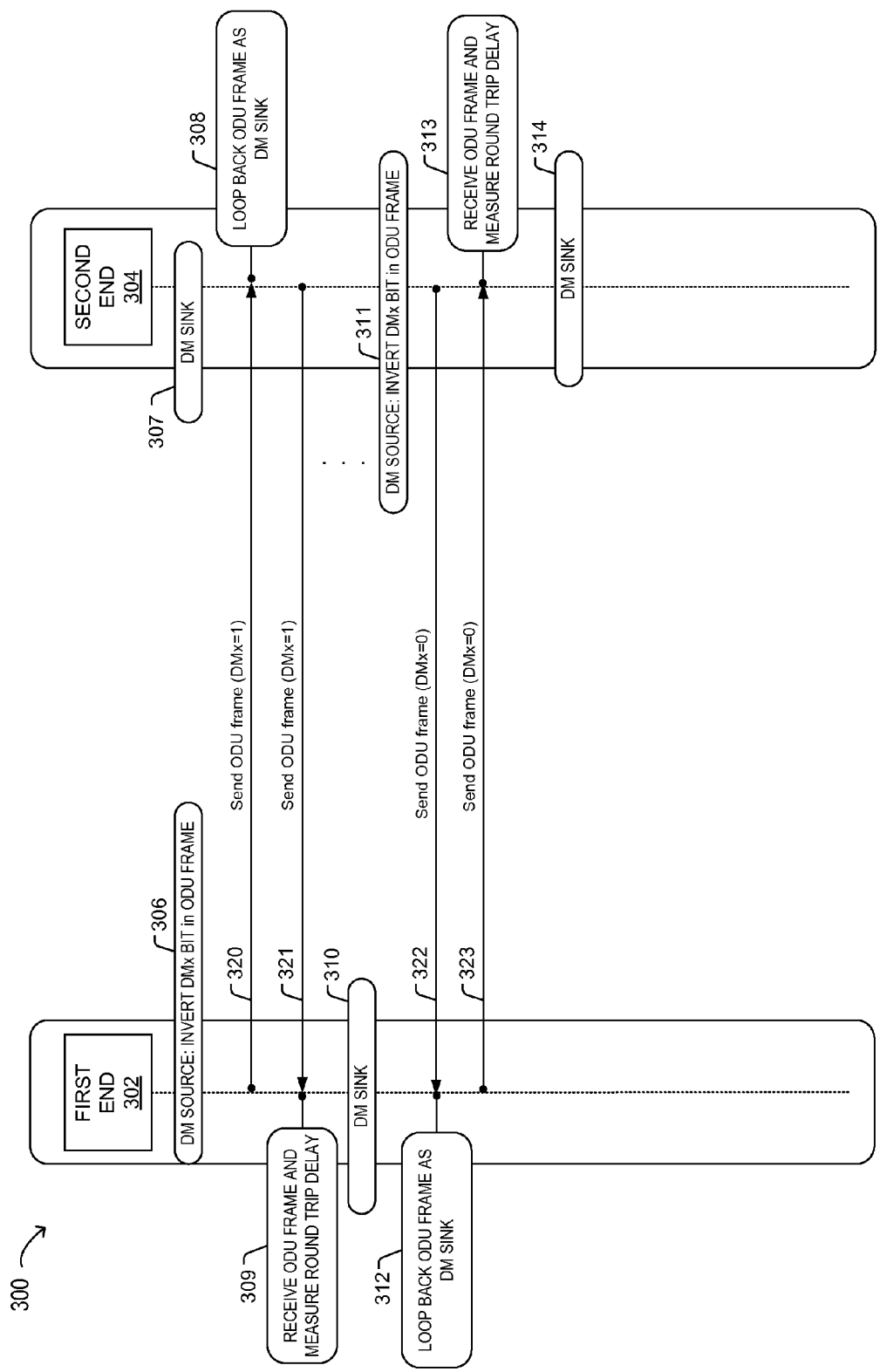
FIG. 3 is a transaction diagram of selected elements of an embodiment of a method for collision control during delay measurement in OTNs.

Referring now to FIG. 3, a transaction diagram of selected elements of an embodiment of method 300 for collision control during delay measurement in optical transport networks is depicted. The transaction diagram in FIG. 3 depicts delay measurements between first end 302 and second end 304, and illustrates operations at each end as well as transactions (or communications) transmitted and received between first end 302 and second end 304 where time advances in the downward direction. Method 300 may be performed using network element 102 (see FIG. 1) for any DM layer x, such as layers shown in OTN 200 in FIG. 2. It is noted that certain operations described in method 300 may be optional or may be rearranged in different embodiments.

In method 300, first end 302 and second end 304 may generally be set to DM sink before method 300 begins. At 306, a first delay measurement may be initiated and may result in first end 302 being set to DM source and inverting a DMx bit in an ODU frame. The DMx bit may be inverted from a previous value that is assumed to be 0 at 306. At 307, second end 304 remains set as a DM sink. At 320, the ODU frame is sent from first end 302 to second end 304, with a DMx value of 1. At 308, second end 304 receives the ODU frame from 320 and loops the ODU frame back to first end 302 as the DM sink. At 321, the ODU frame with DMx bit equal to 1 is sent back to first end 302. At 309, first end 302 receives the ODU frame and measures a round trip delay of the ODU frame, thereby generating a delay measurement result. In various embodiments, the delay measurement result may range from less than 1 millisecond to less than 500 milliseconds. Immediately after 309, first end 302 may be set to DM sink at 310, thereby completing the first delay measurement.

Then in method 300, at 311, a second delay measurement may be initiated and may result in second end 304 being set to DM source and inverting a DMx bit in an ODU frame. The DMx bit may be inverted from a previous value that is assumed to be 1 at 311. At 322, the ODU frame is sent from second end 304 to first end 302, with a DMx value of 0. At 312, first end 302 receives the ODU frame from 322 and loops the ODU frame back to second end 304 as the DM sink. At 323, the ODU frame with DMx bit equal to 0 is sent back to second end 304. At 313, second end 304 receives the ODU frame and measures a round trip delay of the ODU frame, thereby generating a delay measurement result. In various embodiments, the delay measurement result may range from less than 1 millisecond to less than 500 milliseconds. Immediately after 313, second end 304 may be set to DM sink, thereby completing the second delay measurement.

Figure 4:
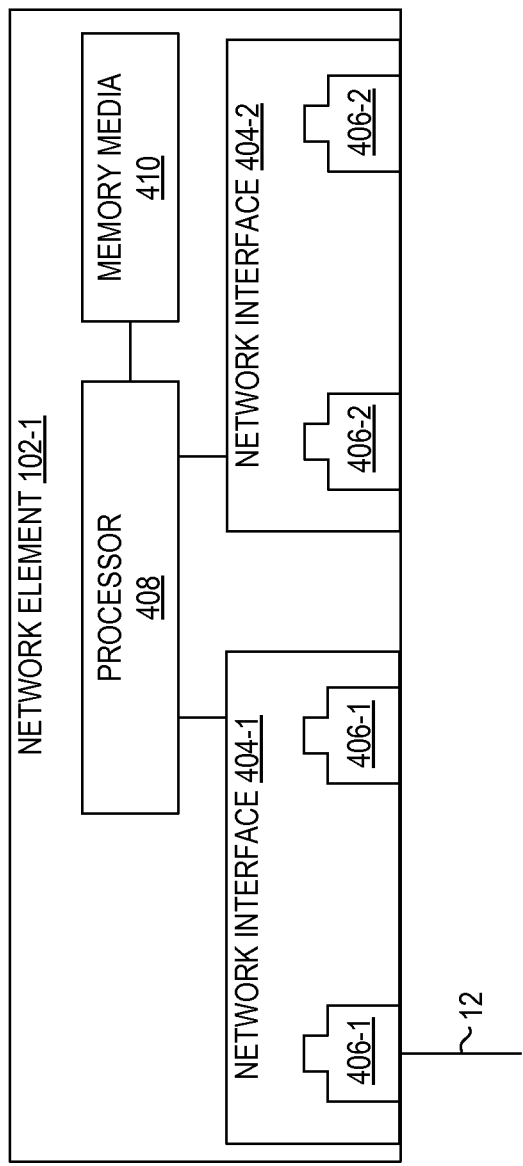
FIG. 4 is a block diagram of selected elements of an embodiment of a network element for implementing collision control during delay measurement in OTNs.

Referring now to FIG. 4, a block diagram of selected elements of an embodiment of network element 102-1, which is represented as a particular embodiment of network elements 102 (see FIG. 1) for descriptive purposes, is illustrated. Network element 102-1, as shown, includes processor 208 and memory media 210, along with network interface 204-1 having ports 206-1 and network interface 204-2 having ports 206-2.

As depicted in FIG. 4, each network element 102 may include processor 408 and memory media 410 that may store instructions executable by processor 408. As shown, memory media 410 may represent volatile, non-volatile, fixed, and/or removable media, and may be implemented using magnetic and/or semiconductor memory. Memory media 410 is capable of storing instructions (i.e., code executable by processor 408) and/or data. Memory media 410 and/or at least a portion of contents of memory media 410 may be implemented as an article of manufacture comprising non-transitory computer readable memory media storing processor-executable instructions. Memory media 410 may store instructions including an operating system (OS), which may be any of a variety of operating systems, such as a UNIX variant, LINUX, a Microsoft Windows® operating system, or a different operating system. It is noted that network interface 404 may also include a processor and memory media (not shown) in certain embodiments. A processor and memory included with network element 102, such as processor 408 and memory media 410 or another processor and memory media, may implement collision control during delay measurement in optical transport networks, as described herein.

In FIG. 4, network elements 102 are shown including at least one network interface 404, which provides a plurality of ports 406 that receive a corresponding transmission media 12 (see also FIG. 1). Ports 406 and transmission media 12 may represent galvanic or optical network connections. Each network interface 404 may include any suitable system, apparatus, or device configured to serve as an interface between a network element 102 and transmission medium 12. Each network interface 404 may enable its associated network element 102 to communicate with other network elements 102 using any of a variety of transmission protocols and/or standards. Network interface 404 and its various components may be implemented using hardware, software, or any combination thereof. In certain embodiments, network interfaces 404 may include a network interface card. In various embodiments, network interfaces 404 may include a line card. Each port 406 may include a system, device or apparatus configured to serve as a physical interface between corresponding transmission medium 12 and network interface 404. In some embodiments, port 406 may comprise an Ethernet port. Although in FIG. 4 network interfaces 404 are shown with 2 instances of ports 406 for descriptive clarity, in different embodiments, network interfaces 404 may be equipped with different numbers of ports 406 (e.g., 4, 6, 8, 16 ports, etc.). In various embodiments, network element 102 may be configured to receive data and route such data to a particular network interface 404 or port 406 based on analyzing the contents of the data or based on a characteristic of a signal carrying the data (e.g., a wavelength or modulation of the signal). In certain embodiments, network element 102 may include a switching element (not shown) that may include a switch fabric (SWF).

As disclosed herein, memory media 410 may include instructions executable by processor 408 to implement collision control during delay measurements when network element 102-1 is included in an OTN.

As will now be described in further detail, the inventors of the present disclosure have discovered a method and system to substantially avoid the problem of delay measurement collisions in OTNs. When pro-active delay measurements are enabled on an ODU layer, such as a PM layer or a TCM layer, the ODU layer may be scheduled at random times for a given number delay measurements in a desired period, such as 5 measurements in a 15-minute period. In a given embodiment, when many such layers belonging to the same ODU or different ODUs are enabled, the ODU layer and the actual trigger time of the delay measurement may be randomized.

Specifically, a time window for scheduling delay measurements may be created. The time window may be divided into a certain number of time slices. Each time slice may include a delay measurement cycle where certain delay measurements defined (or added to) each respective time slice are initiated and performed. Because delay measurements in OTNs typically last less than about 500 milliseconds, the time slice may be a 1 second period in given embodiments. Additionally, at most 1 delay measurement for a given ODU may be scheduled at a given time slice. Because delay measurements are associated with an ODU layer, each time slice includes at most a delay measurement for 1 ODU layer per ODU.

Then, the delay measurements in each successive delay measurement cycle corresponding to each successive time slice, are performed. In this manner, each time slice in the time window is processed. After the time window is complete, the time window may be repeated. It is noted that the time window may be defined with various numbers of time slices. In certain embodiments, the time window may be extended when larger numbers of ODU layers are present in an OTN.

Furthermore, since maintaining a given network element as a DM source for a longer time period may increase the likelihood of DM collisions, the methods for collision control described herein may return the DM source to DM sink mode when possible, which may further decrease opportunities for DM collisions to occur.

In network 100, OTN network elements 102 may implement performance monitoring operations, which may be executed every second and may result in data being accumulated and stored as a binned sample, for example, for a binning period. The process may continue again in a next binning period, and so-on, for example. Pro-active delay measurements may be scheduled and initiated as part of the performance monitoring operation poll cycle. Using the time window and time slices, a random ODU layer of a random ODU may be scheduled for delay measurements. Furthermore, on-demand delay measurements may be enabled by adding delay measurements to a time slice in the time window. For example, when a request for a delay measurement is received, a next available time slice that meets the criteria for collision control may be selected. The on-demand delay measurement may then be added as a DM element in a delay measurement cycle associated with the time slice.

In some embodiments, randomization of delay measurements may be implemented using a time window that is a 2-dimensional vector of N time slices and k-number of DM elements per time slice, which allows for scheduling of N*k number of delay measurements. A delay measurement cycle may be defined by up to k-number of DM elements that are processed to initiate delay measurements during each time slice, depending on how many DM elements have been populated in (or added to) each time slice, which may vary. Each DM element may store DM information for each delay measurement, such as an ODU layer value and ODU entity information, which may be an OTN identifier. When proactive delay measurement is enabled on an ODU layer, a next available time slice in the vector may be selected to avoid any 2 ODU layers associated with the same ODU being specified in a single time slice. Thus, each time slice may include at most 1 DM element specifying a given ODU. The selected time slice may be populated with the corresponding DM element, including the DM information.

When the time window is processed for execution, successive time slices beginning with an initial time slice may be selected and the delay measurement cycle for each time slice is performed, during which delay measurements corresponding to each DM element in the time slice are initiated and performed. For example, when a time slice corresponds to a 1 second period, each time slice is processed each second. The time window may be repeated after completion. When binning is performed, M number of time windows may be repeated for a bin interval B. In this manner, every N seconds each time slice may be processed at least once and M times in each B-minute period. It is noted that in various embodiments, different values for N, M, B, and k may be selected, as desired.

In a particular embodiment, the time slice is a 1 second period, N=180, M=5, and B=15 minutes. In this embodiment, let a DM element for ODU A having ODU layer y be inserted into time slice 5. Then subsequently a DM element having ODU layer z for ODU A will not be inserted into time slice 5 in the time window.

Furthermore, at the start of a time window (or a bin), an initial time slice to begin the time window may be selected at random, while each successive time slice in the time window is processed sequentially. After the last time slice in the time window, the first time slice in the time window may be a successive time slice. The random selection of the initial time slice may further reduce the chances of a collision. When a time slice is processed for delay measurement, the ODU layer stored in the time slice may be marked in a PM request buffer as '1', representing an instruction to start a delay measurement in the delay measurement cycle for the time slice.

Figure 5:
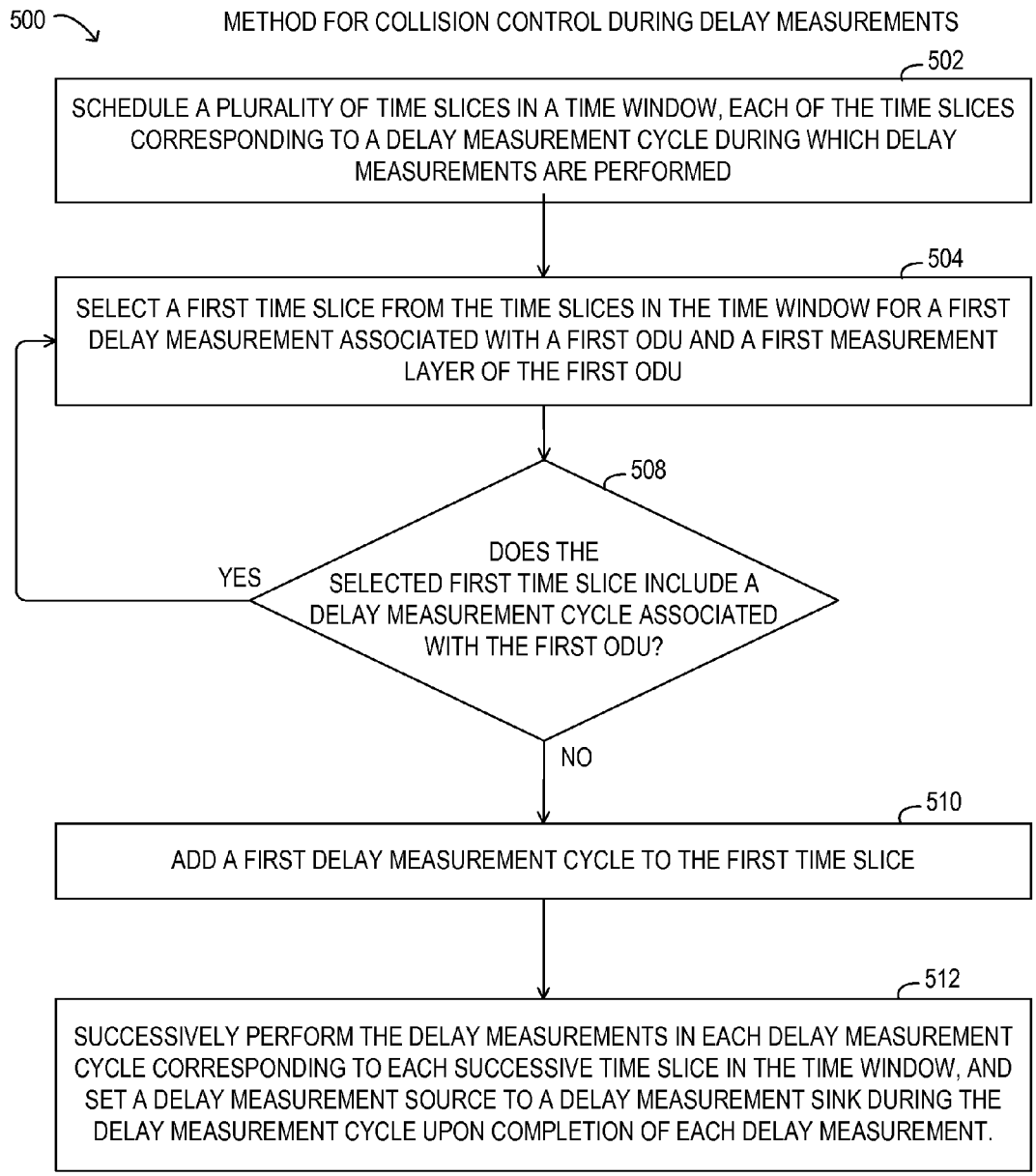
FIG. 5 is a flowchart illustrating an embodiment of a method for collision control during delay measurement in OTNs.

In some embodiments, the algorithm in Table 1 may be used to select seed value for a random time slice:
shelf property: shelf number
slot property=slot number
odu_id=port number+muxing info+TPN #
time=time( )
Seed=f(shelf property, slot property, odu_id, layer, time)
Table 1: Example Algorithm to Select a Random Time Slice Referring now to FIG. 5, selected elements of an embodiment of method 500 for collision control during delay measurements, as described herein, is shown in flow chart format. In various embodiments, method 500 may be implemented using network element 102 (see FIGS. 1 and 5). It is noted that certain operations depicted in method 500 may be rearranged or omitted, as desired.

Method 500 may begin by scheduling (operation 502) a plurality of time slices in a time window, each of the time slices corresponding to a delay measurement cycle during which delay measurements are performed. The time window and information about the time slices may be maintained at a first network element serving as a DM source that initiates delay measurements to other network elements. Because the other network elements serve as a DM sink with respect to the time window and time slices maintained by the first network element, the DM sink network elements may operate in a loopback mode and may have no knowledge of the time window and the time slices. A first time slice from the time slices in the time window is selected (operation 504) for a first delay measurement associated with a first ODU and a first measurement layer of the first ODU. Then a decision may be made whether the first selected time slice includes (operation 508) a delay measurement cycle associated with the first ODU. When the first selected time slice includes a delay measurement associated with the first ODU, the result of operation 508 is YES, and method 500 may loop back to operation 504 where another time slice may be selected as the first time slice. When the first selected time slice does not include a delay measurement associated with the first ODU, the result of operation 508 is NO and the first delay measurement cycle is added (operation 510) to the first time slice. The delay measurements in each delay measurement cycle corresponding to each successive time slice in the time window are successively performed (operation 512), and a delay measurement source is set (operation 512) to a delay measurement sink during the delay measurement cycle upon completion of each delay measurement.

As disclosed herein, methods and systems for collision control during delay measurements in optical transport networks include scheduling delay measurements in time slices of a time window. At most, one delay measurement per time slice is scheduled and performed for each optical data unit (ODU) in an optical transport network (OTN).

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for collision control during delay measurements in optical transport networks, the method comprising:
at an optical transport network (OTN) node processing optical data units (ODU) respectively corresponding to different domains of an OTN associated with the OTN node, scheduling a plurality of time slices in a time window, wherein each of the time slices corresponds to a delay measurement cycle during which delay measurements are performed;
adding a first delay measurement cycle to a first time slice in the time slices, wherein the first delay measurement cycle is associated with a first ODU and a first delay measurement layer of the first ODU, wherein, when the first delay measurement cycle is added to the first time slice, the first time slice does not already include a delay measurement cycle associated with the first ODU; and successively performing the delay measurements in each delay measurement cycle corresponding to each successive time slice in the time window, including setting a delay measurement source to a delay measurement sink during the delay measurement cycle upon completion of each delay measurement.

2. The method of claim 1, wherein an initial time slice to begin the time window is selected at random.

3. The method of claim 1, wherein a time slice is a one second period and a time window includes 180 time slices, and wherein a delay measurement layer corresponds to a tandem connection monitoring layer in an International Telecommunications Union-Telecommunication Standardization Sector (ITU-T) G.709 ODU frame structure.

4. The method of claim 1, further comprising:
selecting the first time slice as a next available time slice that does not include a delay measurement associated with the first ODU.

5. The method of claim 1, wherein adding the first delay measurement cycle further comprises:
adding the first delay measurement cycle in response to a request for a delay measurement.

6. The method of claim 1, wherein adding the first delay measurement cycle further comprises:
adding the first delay measurement cycle in response to activating pro-active delay measurements at the OTN node, wherein a pro-active delay measurement is repeated at a given time slice in each time window.

7. The method of claim 1, wherein the first time slice is randomly selected among the time slices in the time window.

8. An article of manufacture, comprising:
a non-transitory, computer-readable medium; and
computer executable instructions stored on the computer-readable medium, the instructions readable by a processor and, when executed, for causing the processor to:
at an optical transport network (OTN) node processing optical data units (ODU) respectively corresponding to different domains of an OTN associated with the OTN node, schedule a plurality of time slices in a time window, wherein each of the time slices corresponds to a delay measurement cycle during which delay measurements are performed;
add a first delay measurement cycle to a first time slice in the time slices, wherein the first delay measurement cycle is associated with a first ODU and a first delay measurement layer of the first ODU, wherein, when the first delay measurement cycle is added to the first time slice, the first time slice does not already include a delay measurement cycle associated with the first ODU; and
successively perform the delay measurements in each delay measurement cycle corresponding to each successive time slice in the time window, including instructions to set a delay measurement source to a delay measurement sink during the delay measurement cycle upon completion of each delay measurement.

9. The article of manufacture of claim 8, wherein a time slice is a one second period and a time window includes 180 time slices, wherein a delay measurement layer corresponds to a tandem connection monitoring layer in an International Telecommunications Union-Telecommunication Standardization Sector (ITU-T) G.709 ODU frame structure, and wherein an initial time slice to begin the time window is selected at random.

10. The article of manufacture of claim 8, further comprising instructions to:
select the first time slice as a next available time slice that does not include a delay measurement associated with the first ODU.

11. The article of manufacture of claim 8, wherein adding the first delay measurement cycle further comprises:
adding the first delay measurement cycle in response to a request for a delay measurement.

12. The article of manufacture of claim 8, wherein adding the first delay measurement cycle further comprises:
adding the first delay measurement cycle in response to activating pro-active delay measurements at the OTN node, wherein a pro-active delay measurement is repeated at a given time slice in each time window.

13. The article of manufacture of claim 8, wherein the first time slice is randomly selected among the time slices in the time window.

14. A network element, comprising:
a memory;
a processor coupled to the memory; and
processor-executable instructions stored on the memory, the instructions readable by the processor and, when executed, for causing the processor to:
schedule a plurality of time slices in a time window, wherein each of the time slices corresponds to a delay measurement cycle during which delay measurements are performed, wherein the network element processes optical data units (ODU) respectively corresponding to different domains of an OTN associated with the network element;
add a first delay measurement cycle to a first time slice in the time slices, wherein the first delay measurement cycle is associated with a first ODU and a first delay measurement layer of the first ODU, wherein, when the first delay measurement cycle is added to the first time slice, the first time slice does not already include a delay measurement cycle associated with the first ODU; and
successively perform the delay measurements in each delay measurement cycle corresponding to each successive time slice in the time window, including instructions to set a delay measurement source to a delay measurement sink during the delay measurement cycle upon completion of each delay measurement.

15. The network element of claim 14, wherein an initial time slice to begin the time window is selected at random.

16. The network element of claim 14, wherein a time slice is a one second period and a time window includes 180 time slices, and wherein a delay measurement layer corresponds to a tandem connection monitoring layer in an International Telecommunications Union-Telecommunication Standardization Sector (ITU-T) G.709 ODU frame structure.

17. The network element of claim 14, further comprising instructions to:
select the first time slice as a next available time slice that does not include a delay measurement associated with the first ODU.

18. The network element of claim 14, wherein adding the first delay measurement cycle further comprises:
adding the first delay measurement cycle in response to a request for a delay measurement.

19. The network element of claim 14, wherein adding the first delay measurement cycle further comprises:
adding the first delay measurement cycle in response to activating pro-active delay measurements at network element, wherein a pro-active delay measurement is repeated at a given time slice in each time window.

20. The network element of claim 14, wherein the first time slice is randomly selected among the time slices in the time window.

\* \* \* \* \*